United States Patent
Amiri et al.

(10) Patent No.: US 11,946,401 B2
(45) Date of Patent: Apr. 2, 2024

(54) METHOD FOR PREDICTING UREA CRYSTAL BUILD-UP IN AN ENGINE SYSTEM

(71) Applicant: VOLVO PENTA CORPORATION, Gothenburg (SE)

(72) Inventors: Arlena Amiri, Gothenburg (SE); Viktor Palmqvist Berntsson, Gothenburg (SE); Jakob Heide, Gothenburg (SE); Nina Lönn, Torslanda (SE)

(73) Assignee: VOLVO PENTA CORPORATION, Gothenburg (SE)

( * ) Notice: Subject to any disclaimer, the term of this patent is extended or adjusted under 35 U.S.C. 154(b) by 0 days.

(21) Appl. No.: 17/938,526

(22) Filed: Oct. 6, 2022

(65) Prior Publication Data
US 2023/0123398 A1     Apr. 20, 2023

(30) Foreign Application Priority Data
Oct. 19, 2021   (EP) .................................... 21203397

(51) Int. Cl.
*F01N 11/00* (2006.01)
*F01N 3/20* (2006.01)

(52) U.S. Cl.
CPC .......... *F01N 11/005* (2013.01); *F01N 3/2066* (2013.01); *F01N 2390/00* (2013.01);
(Continued)

(58) Field of Classification Search
CPC .. F01N 11/005; F01N 3/2066; F01N 2390/00; F01N 2550/05; F01N 2560/00;
(Continued)

(56) References Cited

U.S. PATENT DOCUMENTS

| | | | |
|---|---|---|---|
| 2012/0167555 A1* | 7/2012 | Frazier | F01N 9/002 60/274 |
| 2013/0028792 A1* | 1/2013 | Yano | F01N 3/208 422/107 |

(Continued)

FOREIGN PATENT DOCUMENTS

| | | |
|---|---|---|
| CN | 111396179 B | 5/2021 |
| EP | 3842625 A1 | 6/2021 |

(Continued)

OTHER PUBLICATIONS

Translation of WO-2021187439-A1 (Year: 2021).*
(Continued)

*Primary Examiner* — Brandon D Lee
(74) *Attorney, Agent, or Firm* — Venable LLP; Jeffri A. Kaminski

(57) ABSTRACT

A method for predicting urea crystal build-up in an engine system when operating according to an intended drive cycle. The method includes providing data representing engine operational conditions for the internal combustion engine during the intended drive cycle, wherein the data comprises values for at least engine speed and engine torque distributed over a time period representing the intended drive cycle; determining values and time variation for at least one exhaust parameter during the time period of the intended drive cycle when the engine system is operated according to the engine operational condition data; providing a reference relation between values and time variation for the at least one exhaust parameter and an expected urea crystal build-up in the engine system when operating the engine system at different engine operational conditions, predicting urea crystal build-up in the engine system when operating according to the intended drive cycle by comparing the determined (Continued)

values and time variation for the at least one exhaust parameter with the reference relation.

15 Claims, 1 Drawing Sheet

(52) U.S. Cl.
CPC ...... *F01N 2550/05* (2013.01); *F01N 2560/00* (2013.01); *F01N 2610/02* (2013.01); *F01N 2900/0601* (2013.01); *F01N 2900/08* (2013.01); *F01N 2900/1404* (2013.01); *F01N 2900/1411* (2013.01)

(58) Field of Classification Search
CPC ......... F01N 2610/02; F01N 2900/0601; F01N 2900/08; F01N 2900/1404; F01N 2900/1411; F01N 2550/00; F01N 2900/0412; F01N 2900/0422; F01N 2900/18; F01N 3/208; F01N 9/005; F01N 11/00; Y02T 10/12; Y02T 10/40
See application file for complete search history.

(56) References Cited

U.S. PATENT DOCUMENTS

| 2019/0063289 A1 | 2/2019 | Yi et al. |
| 2019/0368400 A1 | 12/2019 | Landwehr et al. |
| 2020/0173328 A1* | 6/2020 | Majima ................. B01D 53/94 |

FOREIGN PATENT DOCUMENTS

| WO | 2016184497 A1 | 11/2016 |
| WO | WO-2021187439 A1 * | 9/2021 |

OTHER PUBLICATIONS

Extended European Search Report in corresponding European Application No. 21203397.1 dated Mar. 18, 2022 (7 pages).
European Communication under Rule 71(3) EPC dated Oct. 30, 2023 in corresponding European Patent Application No. 21203397.1, 26 pages.

* cited by examiner

METHOD FOR PREDICTING UREA CRYSTAL BUILD-UP IN AN ENGINE SYSTEM

TECHNICAL FIELD

The invention relates to a method for predicting urea crystal build-up in an engine system when operating according to an intended drive cycle, wherein the engine system comprises an internal combustion engine and an exhaust gas aftertreatment system provided with an urea solution dosage arrangement.

BACKGROUND

Which type and size of internal combustion engine system that should be selected and used in a certain vehicle or machine application depends, for instance, on the intended drive cycle of that vehicle or machine, i.e. the intended or expected distribution of e.g. engine speed and engine torque/load over time. If the engine is too small it is likely to be operated frequently at a very high load that might lead to considerable wear, and if it is too large it might be operated at a too low load that might lead to oil leakage etc.

For commercial vehicles, such as trucks and buses, the intended drive cycle can often be calculated from known road or route data or from GPS data obtained from a vehicle that already operates along the route intended for a new vehicle for which engine system is to be selected.

For stationary and certain vehicle applications, such as electric generators, crushers and fork lifts, it can be more difficult to calculate the drive cycle and thus more difficult to make a proper selection of engine system. In addition, in such stationary and particular vehicle applications it can be more problematic to perform regeneration of an exhaust gas aftertreatment unit forming part of the engine system, such as a diesel particulate filter (DPF). While DPFs of engine systems of trucks and buses often can be subject to active regeneration during operation of the vehicle or be subject to forced "parked" regeneration without affecting operation time too much, many engine systems in stationary or certain vehicle applications that operate under a drive cycle that leads to generation of large amounts of soot and particles cannot be operated so as to actively regenerate the DPF during operation, which leads to a requirement for frequent forced regeneration, which in turn leads to an unacceptable large downtime for the machine or vehicle in that application.

For engine system including an exhaust gas aftertreatment system provided with an urea solution dosage arrangement for reduction of nitrogen oxides (in an SCR-unit, selective catalytic reduction), there is a desire also to avoid build-up of urea crystals in the exhaust system. Such crystals can lead to e.g. increased backpressure in the system, and urea crystals are typically difficult to remove.

A purpose of this invention is to provide a method for predicting urea crystal build-up in an engine system when operating according to an intended drive cycle. This can be used for predicting the risk for urea crystal build-up, which in turn can be used for properly selecting internal combustion engine system, not only for stationary and particular vehicle applications of the type mentioned above but also for other applications. The prediction method is useful also for planning a drive cycle for a particular engine system, i.e. an initially intended drive cycle can be adapted or adjusted so as to avoid urea crystal build-up.

SUMMARY

The invention concerns a method for predicting urea crystal build-up in an engine system when operating according to an intended drive cycle, wherein the engine system comprises an internal combustion engine and an exhaust gas aftertreatment system (EATS) provided with an urea solution dosage arrangement. The method comprises:

- (S10) providing data representing engine operational conditions for the internal combustion engine during the intended drive cycle, wherein the data comprises values for at least engine speed and engine torque distributed over a time period representing the intended drive cycle;
- (S20) determining values and time variation for at least one exhaust parameter during the time period of the intended drive cycle when the engine system is operated according to the engine operational condition data;
- (S30) providing a reference relation between values and time variation for the at least one exhaust parameter and an expected urea crystal build-up in the engine system when operating the engine system at different engine operational conditions;
- (S40) predicting urea crystal build-up in the engine system when operating according to the intended drive cycle by comparing the determined values and time variation for the at least one exhaust parameter with the reference relation;

wherein the exhaust parameter is at least one of: an exhaust gas temperature, an exhaust gas mass flow rate, and/or an exhaust gas energy ratio reflecting an energy content of the exhaust gas in relation to the energy required to evaporate dosed urea solution.

In short, the method may thus include simulating/calculating operation of the engine system according to the intended drive cycle and determining how the at least one exhaust parameter (i.e. exhaust gas temperature, mass flow rate, and/or energy ratio) varies during the drive cycle, comparing the determined exhaust parameter history with reference data, and predicting the (risk for) urea crystal build-up for the engine system and drive cycle in question.

The invention is partly based on the realization that the values and time variation of each of the exhaust parameters actually can be used as an urea crystal build-up indicator. The reference relation may be based on a relatively large number of tests of the engine system where the engine system has been operated according to various drive cycles followed by checking the magnitude of actual urea crystal build-up. By calculating the values and time variation for the exhaust parameters during these test cycles and comparing with the actual urea crystal build-up, a reference relation between exhaust parameter history and urea crystal build-up can be obtained.

The reference relation may, for instance, say that if at least one of the exhaust parameters is above a corresponding threshold absolute value during at least a minimum portion of the total drive cycle period, it is unlikely that any urea crystal build-up will occur. As an example, such a reference relation can be used to conclude that, if the determined values and time variation for the at least one exhaust parameter during the intended drive cycle fulfils the threshold value/minimum time-criterion, the risk for urea crystal build-up in the engine system in question is "low" or "acceptable" if operating according to the intended drive cycle. More complex reference relations may be used, such as combinations of threshold values and minimum time portions for two or even all three exhaust parameters.

The value and time thresholds for the different exhaust parameters may differ between different engine systems. As an example, for a certain engine system it may be concluded that if the temperature of the exhaust gas that enters the EATS (i.e. the temperature downstream the turbocharger turbine in engine systems provided with a turbocharger) is at least 350° C. during at least 50% of the total time of the intended drive cycle, or, if the exhaust gas mass flow rate is at least 0.20 kg/s during at least 50% of the total time of the intended drive cycle, and/or, if the exhaust gas energy ratio is at least 40 during at least 50% of the total time of the intended drive cycle, then any urea crystal build-up in the engine system is not expected (or, then the risk for urea crystal build-up is low/acceptable).

As to the step of (S10) providing data representing engine operational conditions for the internal combustion engine during the intended drive cycle, the data may be based on real operational data collected from an engine system that has been operated in accordance with the intended drive cycle. If the two engine systems are of the same type and size, i.e. if the engine system for which urea crystal build-up is to be predicted is similar to the engine system from which operational data have been collected, the same engine speed and engine torque values may be used when calculating the exhaust parameter(s). The real operational data may, however, be adapted to the engine system for which urea crystal build-up is to be predicted if, for instance, the engine system for which urea crystal build-up is to be predicted is larger than the engine system from which data has been collected. To convert speed and torque from a first engine system to a second engine system that is larger or smaller than the first system, one may relate to a common power output during the drive cycle. The data representing engine operational conditions for the internal combustion engine during the intended drive cycle do not necessarily have to be collected real data but may e.g. be simulated data based on information on the intended drive cycle.

The operational data preferably comprises engine speed and engine torque at different points of time distributed over the total time of the intended drive cycle. Each data point may represent a certain time period element and all time period elements may together add up to the time period of the intended drive cycle so that the entire drive cycle is covered. As an example, the length of the drive cycle may be in the range 1-24 hours and the number of time period elements may be in the range 3600-850 000.

The step of "(S20) determining values and time variation for at least one exhaust parameter during the time period of the intended drive cycle when the engine system is operated according to the engine operational condition data" may be carried out by importing the speed and torque engine operational data into an engine system calculation model that is set to simulate the engine system for which suitability is to be determined and thereby calculate a number of resulting values, such as the exhaust gas temperature and the exhaust gas mass flow, at certain points in time (during certain time period elements) over the drive cycle.

To calculate the energy ratio, information is also needed on the amount of urea solution dosed into the EATS. Such information can be obtained from a pre-set relation between operational condition (i.e. engine speed and torque) and urea solution dosage, i.e. a certain amount of urea solution is dosed at each time period element depending on speed and torque at that point in time. Each data point used for determining values and time variation for the exhaust parameters may thus relate to a certain time period element and comprise engine speed and torque (from the operational data) as well as amount of urea solution dosage.

Although it is typically convenient to determine vales and time variation for all three exhaust parameters in step S20 and thereby get all data that might be needed for predicting the urea crystal build-up, it is not necessary to make all determinations before performing step S40 since it may be sufficient to use only e.g. the exhaust gas temperature to predict whether urea crystal build-up is likely or not.

As to the reference relation provided in step S30 it may be noted that this step typically is carried out before the other steps of the method.

The step of "(S40) predicting urea crystal build-up in the engine system when operating according to the intended drive cycle by comparing the determined values and time variation for the at least one exhaust parameter with the reference relation" may comprise evaluating whether one or more of the exhaust parameters exhibit values that are above or below corresponding pre-set threshold limits with regard to absolute values and time fraction of the total time of the intended drive cycle.

As to the calculations for determining the exhaust parameters it can generally be said that this can be done in various ways and that an engine system calculation model can be used. Such models may be more or less complex. The principles of an example of a useful model involving both look-up tables and thermodynamic simulation are described further below.

The exhaust gas temperature and the exhaust gas mass flow rate are well-known engine parameters as such, although in other applications than prediction of urea crystal build-up. The exhaust gas energy ratio reflects the energy content of the exhaust gas in relation to the energy required to evaporate dosed urea solution. The numerator of this ratio typically includes a term depending on both the temperature and the mass flow rate of the exhaust gas, whereas the denominator may include at least a first term related to heating of the urea solution (which typically is water based) from injection temperature to evaporation temperature and a second term related to the heat of evaporation of the (water based) solution. The exhaust gas energy ratio can be calculated in at least slightly different ways. In general, the risk for urea crystal build-up decreases with increasing exhaust parameter (i.e. anyone of exhaust gas temperature, exhaust gas mass flow rate and exhaust gas energy ratio). As mentioned above, at least for certain engine systems and certain drive cycles, it is sufficient if one of the three exhaust parameters is above a given value/time-threshold to conclude that the risk for urea crystal build-up is sufficiently small.

In an embodiment the data representing engine operational conditions during the intended drive cycle are based on real engine operational data collected during a drive cycle corresponding to the intended drive cycle.

In an embodiment the method comprises: determining values and time variation for at least two, preferably all three, exhaust parameters during the time period of the intended drive cycle when the engine system is operated according to the engine operational condition data.

In an embodiment the step of (S20) determining values and time variation for the at least one exhaust parameter during the time period of the intended drive cycle comprises determining values for the at least one exhaust parameter at a plurality of points of time distributed over the time period representing the intended drive cycle. As mentioned above, each of these points of time can represent a time period element.

In an embodiment the exhaust gas temperature and/or the exhaust gas mass flow rate is/are obtained from an engine calculation model using engine speed and engine torque as input data. Values for the exhaust gas temperature and/or the exhaust gas mass flow rate can be calculated for all operation points, i.e. for all time period elements.

In an embodiment the exhaust gas energy ratio is obtained from: i) a numerator that depends on at least the exhaust gas temperature and the exhaust gas mass flow rate, and ii) a denominator that comprises at least one term dependent on the amount of urea solution dosage. The numerator may be the product of the exhaust gas mass flow rate times the heat capacity of the exhaust gas (or air) times the exhaust gas temperature. The temperature may be the actual temperature or, in a variant, the temperature above the boiling point of the urea solution. The denominator may comprise various terms depending on, for instance, the desire for simplifying the expression used in the calculations. In some applications it may be suitable to use a more complex expression to get a sufficient accuracy. The at least one term dependent on the amount of urea solution dosage may be i) the product of urea solution dosage amount (during a certain time interval, i.e. rate) times the specific energy needed to heat urea solution from injection temperature to evaporation, and/or ii) the product of urea solution dosage amount (or rate) times the specific energy needed for evaporation of the urea solution. The evaporation energy may include separate terms relating to the energy for evaporating water and to the energy for evaporating urea.

Further terms may be included in the denominator, such as the energy needed to heat water vapour. Although the exhaust gas energy ratio can be calculated in different ways, it provides a measure on the energy content of the exhaust gas in relation to the energy needed to evaporate the urea solution. Values for the exhaust gas energy ratio can be calculated for all operation points, i.e. for all time period elements.

In an embodiment the step of (S20) determining values and time variation for the at least one exhaust parameter during the time period of the intended drive cycle comprises determining values and time variation for the exhaust gas energy ratio, wherein the method further comprises: selecting, from a pre-set relation between engine operational conditions and amount of urea solution dosage, an amount of urea solution dosage that corresponds to the engine operational conditions that apply at the corresponding point of time. For instance, a table or matrix can be provided where a certain amount of urea solution dosage is given as a function of operation point, i.e. as a function of certain engine speed and certain engine torque. Thereby it can be obtained an amount of urea solution dosage for each time period element. The amount of urea solution dosage can then be used, together with exhaust gas temperature and exhaust gas mass flow rate, for calculating the exhaust gas energy ratio for each time period as described above.

In an embodiment the reference relation is based on a plurality of tests of the engine system where the engine system has been operated according to various drive cycles followed by checking the magnitude of actual urea crystal build-up. The operational points of the drive cycles are well documented so that the exhaust parameters can be obtained for each time period element in line with what is described above. The actual urea crystal build-up can then be related to the values and time variation of each of the exhaust parameters.

In an embodiment the reference relation comprises a threshold value for the exhaust parameter and a corresponding minimum portion of the total time period of the intended drive cycle, wherein the threshold value and the minimum portion of time are set so that, if the determined values and time variation for the at least one exhaust parameter during the intended drive cycle are such that the exhaust parameter threshold value is exceeded during at least the minimum portion of the total time period, the predicted amount of urea crystal build-up in the engine system is zero or below a threshold level for the urea crystal build-up. Such threshold value and minimum portion of time can work as an "acceptability limit". For some engine systems it may be sufficient that one of the exhaust parameters fulfils the criterion. Combined criteria for two or more exhaust parameters may be used to e.g. reach an "acceptability limit" even if none of the exhaust parameters alone fulfils its corresponding criterion.

In an embodiment the method comprises the step of determining suitability of the engine system for the intended drive cycle, and further comprising determining whether the engine system is suitable for the intended drive cycle with regard to the build-up of urea crystals in the exhaust gas aftertreatment system. A first step in such a method may be to determine suitability based on engine speed and load. In a next step one may determine suitability with regard to the EATS.

In an embodiment the method comprises determining suitability of a plurality of engine systems for an intended drive cycle, wherein each engine system comprises an internal combustion engine and an exhaust gas aftertreatment system provided with an urea solution dosage arrangement, and wherein the internal combustion engine and/or the exhaust gas aftertreatment system differ(s) between the plurality of engine systems; and comparing the suitability of the plurality of engine systems with regard to the build-up of urea crystals in the exhaust gas aftertreatment system.

In an embodiment the internal combustion engine is of the compression-ignition type, such as a diesel engine. Typically, the engine system is provided with a turbocharging arrangement where a compressor driven by an exhaust turbine charges intake air to the internal combustion engine. The exhaust gas temperature used in the method for predicting urea crystal build-up should then preferably be the temperature downstream the turbine.

In an embodiment the exhaust gas aftertreatment system comprises an SCR-unit, i.e. a selective catalytic reduction-unit configured to reduce $NO_2$ (and other nitrogen oxides) using compounds obtained from the urea solution (after decomposition and evaporation). The EATS may also comprise a diesel oxidation catalyst (DOC) and a diesel particle filter (DPF). Injection of urea solution is done upstream of the SCR-unit (and downstream of any turbocharger turbine).

The invention also concerns computer-implemented inventions:

A computer program product comprising program code means for performing the steps above when said program is run on a computer.

A computer readable medium carrying a computer program comprising program code means for performing the steps above when said program product is run on a computer.

A control unit for controlling a method for determining suitability of an engine system for an intended drive cycle, the control unit being configured to perform the steps of the method according to above.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
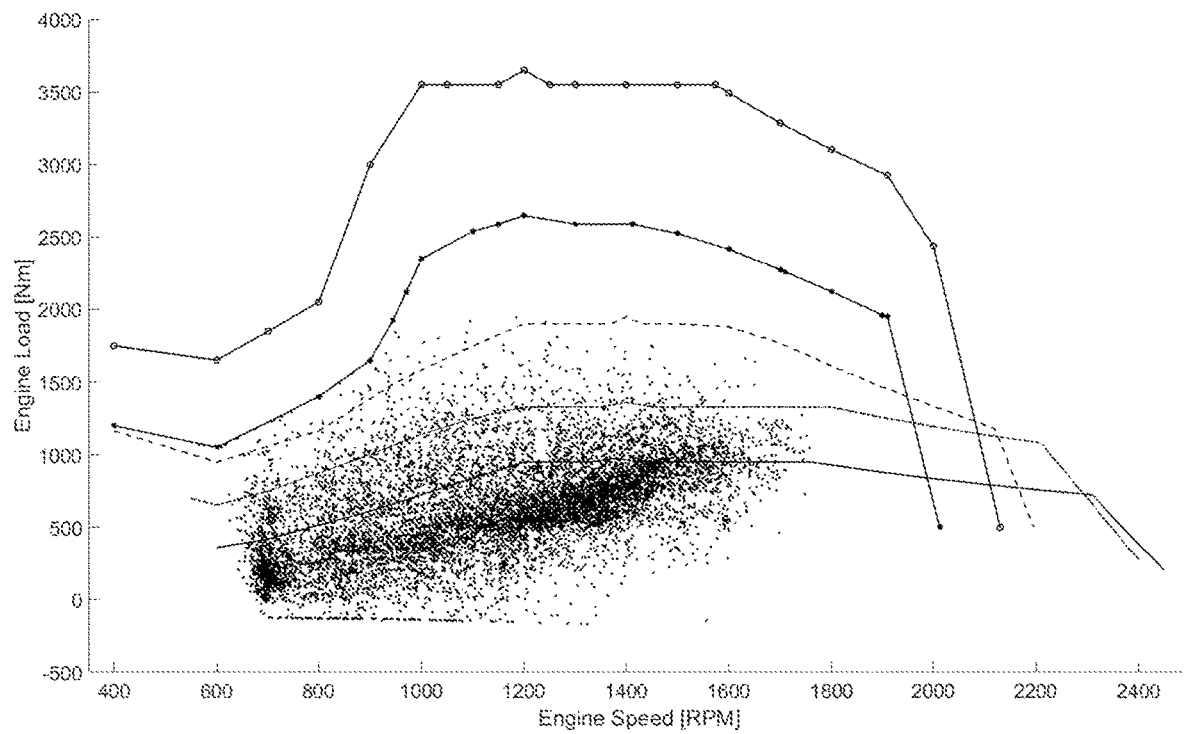
FIG. 1 shows a plot of data representing engine operational conditions during an intended drive cycle.
Figure 2:
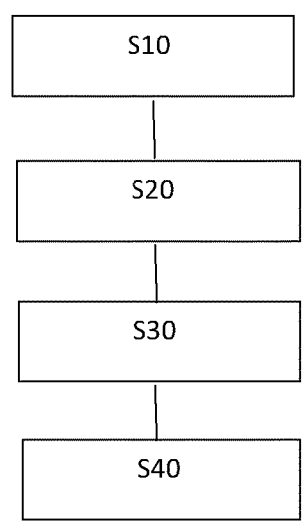
FIG. 2 shows, schematically, an illustrated of a method according to this disclosure.

FIG. 1 shows a plot of data representing engine operational conditions during an intended drive cycle. Each data point shows engine speed and engine torque at a certain time period element of the entire drive cycle time period.

The different lines in FIG. 1 indicate full-load curves for different engine systems of different size where the uppermost line represents the largest engine and the lowest line represents the smallest engine. As indicated in FIG. 1, the largest engine seems to be unnecessarily large, it will have to operate with a load that probably is too low for the intended drive cycle, whereas the smallest engine is too small, although it might be sufficient for an average load/torque it cannot provide sufficient torque for a great portion of the time period elements of the intended drive cycle. FIG. 1 thus indicates suitability of various engine systems for an intended drive cycle based on engine speed and engine load, but it does not include suitability with regard to EATS performance.

An example of the method of this disclosure is schematically illustrated in FIG. 3 and may be described as follows:

S10—providing data representing engine operational conditions for the internal combustion engine during the intended drive cycle, wherein the data comprises values for at least engine speed and engine torque distributed over a time period representing the intended drive cycle.

An example of such data is shown in FIG. 1. The data may be obtained by collecting operational data from the (old) engine system used presently in the application in which it is intended to replace the engine system for a new engine system (for which the suitability is to be determined and for which the urea crystal build-up is to be predicted). If the internal combustion engines of the new and old engine systems are of the same size and type one may use the same engine speed and torque values. If the new internal combustion engine is of (significantly) different size and type, the original speed and torque vales may be adapted (e.g. to give the same power output) before determining values and time variation for the exhaust parameter(s).

S20—determining values and time variation for at least one exhaust parameter during the time period of the intended drive cycle when the engine system is operated according to the engine operational condition data.

The principles of an example for how to carry out step S20 can be described as follows:

Data points as exemplified in FIG. 1 form input data to a calculation model, i.e. data on engine speed and engine torque at different points of time of the intended drive cycle. Exhaust gas temperature and exhaust gas mass flow rate downstream a turbocharger turbine of the engine system subject to the calculations are obtained from look-up tables. The look-up tables are obtained from operation of the engine system at all engine speeds from idling to maximum speed and at all loads from zero to maximum load. (This operation may be done in a previous phase, such as when developing the engine.) Two alternative look-up tables are used depending on the operating mode of the engine, one table for cool EATS and one for warm/hot EATS. Which table to use depends on the simulated EATS temperature at that point in time. The EATS is assumed to be cool when starting the engine.

The data on exhaust gas temperature and mass flow rate obtained for a certain point of operation are then fed to a numerical model of a pipe extending between the turbine and the EATS. The numerical model provides for a delay of any temperature change and also a decrease of temperature due to heat conduction away from the pipe. Downstream the pipe, a diesel oxidation catalyst (DOC) and a DPF are thermodynamically simulated as thermal inertia. A further numerical model simulates a further pipe and downstream that further pipe an SCR-unit (selective catalytic reduction) may be simulated in a similar way as the DOC and the DPF. The calculated temperature of the outgoing exhaust gas is used to select look-up table for the next operational data point (i.e. the next time period element).

A further look-up table is provided for obtaining amount of urea solution dosage for each time period element. This table provides the amount of urea solution dosage as function of engine speed and torque. The amount of urea solution dosage is then used, together with e.g. exhaust gas temperature and exhaust gas mass flow rate, to calculate the exhaust gas energy ratio for each time period element, for instance according to the following:

Energy ratio=(exhaust gas mass flow+exhaust gas temperature−heat capacity for air), divided by (amount of urea solution dosage−heat capacity for water·(100° C.—temperature in ° C. of urea solution when dosed into the EATS)+(amount of urea solution dosage·heat of evaporation for water).

Output from these calculations are then values for each of the exhaust parameters for each operational data point. Since these points are distributed over the drive cycle time period one obtains a determination of the values and time variation for all three exhaust parameters during the time period of the intended drive cycle when the engine system is operated according to the engine operational condition data.

S30—providing a reference relation between values and time variation for the at least one exhaust parameter and an expected urea crystal build-up in the engine system when operating the engine system at different engine operational conditions.

As mentioned previously, various reference relations are possible. Further, the reference relation may differ between different engine systems. In an example there are threshold values and corresponding minimum time fractions set for each of the exhaust parameters so it can be said that if the value of a certain exhaust parameter is at least X during at least Y % of the total drive cycle time period, then no (or only very little) urea crystal build-up is expected.

S40—predicting urea crystal build-up in the engine system when operating according to the intended drive cycle by comparing the determined values and time variation for the at least one exhaust parameter with the reference relation.

The comparison is relatively easy if all time period elements have the same length and if the reference relation comprises threshold values and corresponding minimum time fractions for each of the exhaust parameters as explained in relation to step S30. One may then, for each exhaust parameter at a time if desired, check whether the exhaust parameter values are above X for Y % of the time period elements. If this is the case for a first of the exhaust parameters, it may be concluded that the predicted urea crystal build-up in the engine system when operating according to the intended drive cycle is negligible or acceptable. If this is not the case for the first exhaust parameter, a second (and if necessary also a third) exhaust parameter can be subject to a similar assessment. Another procedure may be more suitable depending on the structure of the reference relation.

It is to be understood that the present invention is not limited to the embodiments described above and illustrated in the drawings; rather, the skilled person will recognize that many changes and modifications may be made within the scope of the appended claims.

The invention claimed is:

1. A computer implemented method for predicting urea crystal build-up in an engine system when operating according to an intended drive cycle,
   wherein the engine system comprises an internal combustion engine and an exhaust gas aftertreatment system provided with an urea solution dosage arrangement, the computer implemented method comprising:
   providing data representing engine operational conditions for the internal combustion engine during the intended drive cycle to a computer, wherein the data comprises values for at least engine speed and engine torque distributed over a time period representing the intended drive cycle;
   importing the speed and torque engine operational data into an engine system calculation model that is set to simulate the engine system on the computer;
   determining with the computer values and time variation for at least one exhaust parameter during the time period of the intended drive cycle when the engine system is operated according to the engine operational condition data, based on the speed and torque engine operational data;
   providing to the computer a reference relation between values and time variation for the at least one exhaust parameter and an expected urea crystal build-up in the engine system when operating the engine system at different engine operational conditions,
   predicting with the computer urea crystal build-up in the engine system when operating according to the intended drive cycle by comparing the determined values and time variation for the at least one exhaust parameter with the reference relation;
   wherein the exhaust parameter is at least one of: an exhaust gas temperature, an exhaust gas mass flow rate, and/or an exhaust gas energy ratio reflecting an energy content of the exhaust gas in relation to the energy required to evaporate dosed urea solution.

2. Method according to claim 1, wherein the data representing engine operational conditions during the intended drive cycle are based on real engine operational data collected during a drive cycle corresponding to the intended drive cycle.

3. Method according to claim 1, wherein the method comprises:
   determining values and time variation for at least two exhaust parameters during the time period of the intended drive cycle when the engine system is operated according to the engine operational condition data.

4. Method according to claim 1, wherein the step of determining values and time variation for the at least one exhaust parameter during the time period of the intended drive cycle comprises determining values for the at least one exhaust parameter at a plurality of points of time distributed over the time period representing the intended drive cycle.

5. Method according to claim 1, wherein the exhaust gas temperature and/or the exhaust gas mass flow rate is/are obtained from an engine calculation model using engine speed and engine torque as input data.

6. Method according to claim 1, wherein the exhaust gas energy ratio is obtained from: i) a numerator that depends on at least the exhaust gas temperature and the exhaust gas mass flow rate, and ii) a denominator that comprises a term dependent on the amount of urea solution dosage.

7. Method according to claim 4, wherein the step of determining values and time variation for the at least one exhaust parameter during the time period of the intended drive cycle comprises determining values and time variation for the exhaust gas energy ratio, wherein the method further comprises: selecting, from a pre-set relation between engine operational conditions and amount of urea solution dosage, an amount of urea solution dosage that corresponds to the engine operational conditions that apply at the corresponding point of time.

8. Method according to claim 1, wherein the reference relation is based on a plurality of tests of the engine system where the engine system has been operated according to various drive cycles followed by checking the magnitude of actual urea crystal build-up.

9. Method according to claim 1, wherein the reference relation comprises a threshold value for the exhaust parameter and a corresponding minimum portion of the total time period of the intended drive cycle, wherein the threshold value and the minimum portion of time are set so that, if the determined values and time variation for the at least one exhaust parameter during the intended drive cycle are such that the exhaust parameter threshold value is exceeded during at least the minimum portion of the total time period, the predicted amount of urea crystal build-up in the engine system is zero or below a threshold level for the urea crystal build-up.

10. Method according to claim 1, wherein the method comprises the step of determining suitability of the engine system for the intended drive cycle, and further comprising determining whether the engine system is suitable for the intended drive cycle with regard to the build-up of urea crystals in the exhaust gas aftertreatment system.

11. Method according to claim 10, wherein the method comprises
   determining suitability of a plurality of engine systems for an intended drive cycle, wherein each engine system comprises an internal combustion engine and an exhaust gas aftertreatment system provided with an urea solution dosage arrangement, and wherein the internal combustion engine and/or the exhaust gas aftertreatment system differ(s) between the plurality of engine systems; and
   comparing the suitability of the plurality of engine systems with regard to the build-up of urea crystals in the exhaust gas aftertreatment system.

12. Method according to claim 1, wherein the internal combustion engine is of the compression-ignition type, such as a diesel engine.

13. Method according to claim 1, wherein the exhaust gas aftertreatment system comprises an SCR-unit.

14. A non-transitory computer readable medium carrying a computer program comprising program code for performing the steps of claim 1 when said program code is run on a computer.

15. A control unit for controlling a method for determining suitability of an engine system for an intended drive cycle, the control unit being configured to perform the steps of the method according to claim 1.

* * * * *